March 31, 1959
H. A. SCHWARTZ
2,879,593
CHEESE MOLD
Filed July 11, 1956
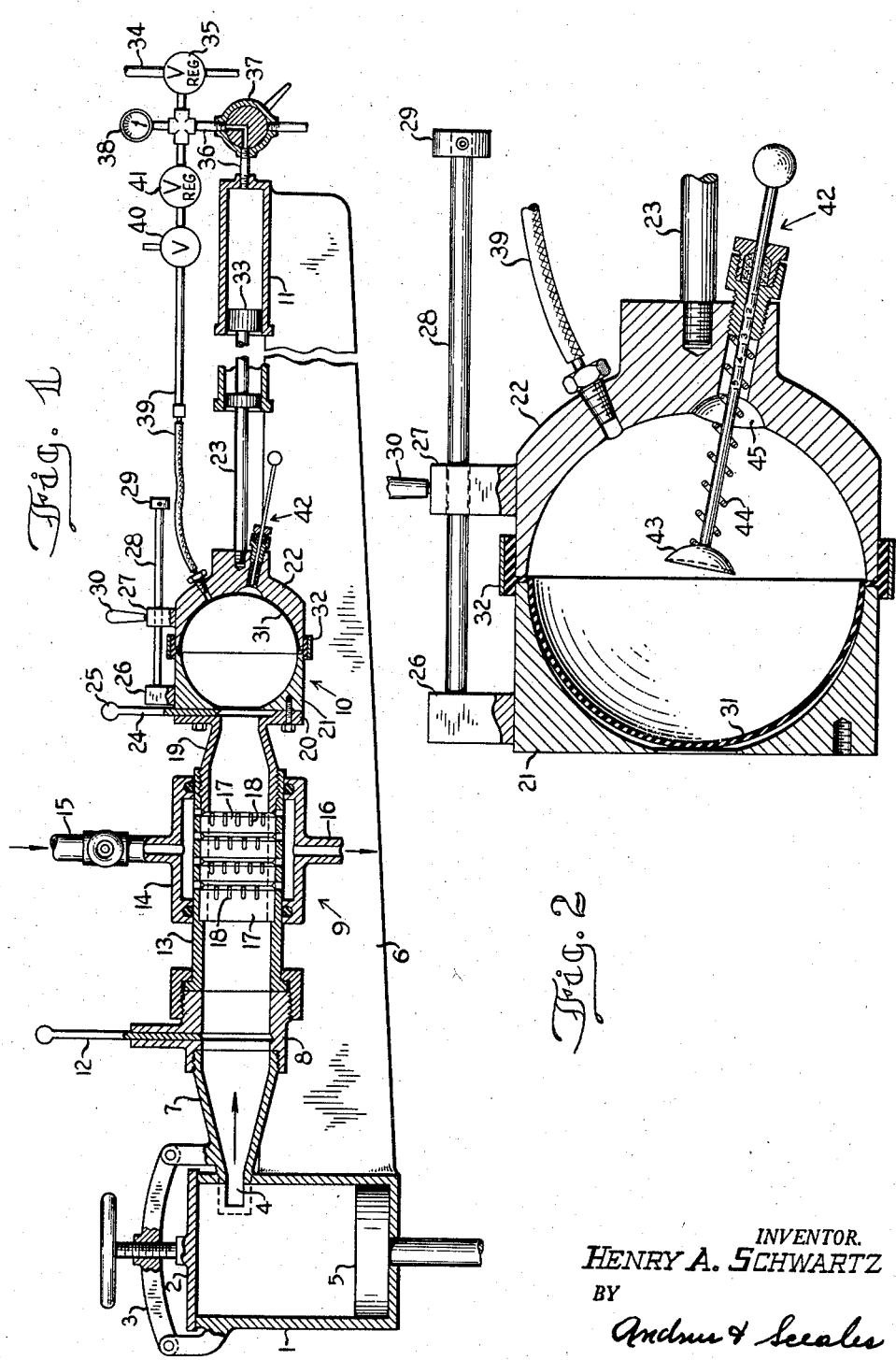
INVENTOR.
HENRY A. SCHWARTZ
BY
Andrus & Seeales
Attorneys

United States Patent Office 2,879,593
Patented Mar. 31, 1959

2,879,593

CHEESE MOLD

Henry A. Schwartz, Sheboygan Falls, Wis., assignor to Cheese Machinery Company, Sheboygan, Wis., a corporation of Wisconsin Application July 11, 1956, Serial No. 597,295

1 Claim. (Cl. 31—42)

This invention relates to apparatus for molding cheese and particularly has reference to a mold for molding cheese to a generally round ball-like shape.

The invention is directed to a round or spherical mold which may be employed in connection with the invention of the copending application entitled Method and Apparatus For Making Cheese, filed June 10, 1955, Serial Number 514,515, and assigned to a common assignee with the present application.

The term cheese as used herein includes cheese curd and freshly formed cheese made from the curd.

In the drawing:

Fig. 1 is a longitudinal sectional view of the apparatus of the invention; and

Fig. 2 is an enlarged sectional view of the mold of the invention.

The description of the invention is directed primarily to the mold of the present invention, but in order to better understand the use of the mold described it is necessary to describe briefly the apparatus which is more fully set forth in the application filed June 10, 1955, above referred to.

Referring to the drawing, there is shown a generally large diameter stuffer cylinder 1 within which the cheese curd to be processed is disposed. Cylinder 1 is closed at the top by a removable cover 2 which is secured to the upper end of the cylinder by bail 3. The cheese is expressed from cylinder 1 through opening 4 and into the cheese processing apparatus by a piston 5 which is operated by pneumatic means, not shown, to move upwardly from the bottom of the cylinder into engagement with the cheese curd to express it as described.

The cheese processing apparatus may be supported from cylinder 1 by a longitudinally extending base 6 secured to cylinder 1, and such apparatus comprises a number of parts through which the cheese curd passes and means for maintaining the cheese curd under a constant pressure.

In general, the cheese processing apparatus comprises the tube 7, a valve tube 8, a stretching or separating section 9, a mold 10 and horizontal cylinder 11.

The cheese curd expressed from cylinder 1 passes through tube 7 and valve tube 8 on its way to stretching section 9. Valve tube 8 carries a gate valve 12 with a sharp edge and valve 12 may be closed across tube 8 should stretching section 9 be removed to prevent loss of curd from cylinder 1 and tube 7.

Stretching section 9 which is more fully described in the copending application referred to heretofore, comprises in general an elongated tubular section 13 encircled by a manifold 14 and with apertures in section 13 through which hot water ranging in temperature from 140° F. to 170° F. passes from the manifold. A supply line 15 is connected to the manifold and supplies the hot water under city pressure and the excess water drains from the manifold at drain 16.

The inside of section 9 is provided with a plurality of rings 17 having transverse bars 18 grooved forwardly of the direction of movement of the cheese curd in line with the apertures in the manifold to form passages for the hot water flowing from manifold 14. Reference to the application referred to may be had for a more complete description of the bars and the hot water flow. In any event as the cheese is forced through rings 17 and over bars 18 under pressures of at least sixty pounds the hot water circulating in the grooves of the bars is drawn into the cheese by the vacuum created as the cheese is forced past the bars 18 and separated thereby. The stretching of the cheese curd as it passes over bars 18 eliminates voids therein and hot water effects the uniting and solidifying of the cheese after it has been separated and stretched.

The cheese passes from bars 18 through spacer tube 19 which is part of stretcher section 9 and thence into the mold which constitutes the subject matter of the present invention.

Tube 19 at its inner end is threaded into stretching section 9 and at its outer end carries an annular flange 20.

Mold 10 previously generally referred to is formed of two members or parts, one part 21 being secured by suitable bolts to flange 20 of tube 19 and the other part 22 being threaded onto the end of a piston rod 23.

In order to separate the cheese expressed into mold 10 from the cheese curd processed in stretching section 9, a knife-like plate 24 is located between flange 20 and part 21 of mold 10. A handle 25 is provided on plate 24 for easily operating the plate to sever the cheese.

Each part 21 and 22 of mold 10 is semi-circular on the inside so that cheese deposited inside the mold will be formed into the shape of a ball.

The part 21 at the top carries a rod support 26 in line with a hollow rod support 27 on the top of mold part 22. A rod 28 is secured to support 26 and passes through support 27. A stop 29 on the end of rod 28 engages support 27 to limit the separation of parts 21 and 22. A handle 30 on support 27 is grasped by the operator to separate the mold parts. The rod 28 thus supports mold part 22 from mold part 21.

A diaphragm 31 is secured inside mold part 22. As shown, the diaphragm is of rubber or other flexible material and is clamped to part 22 by split clamp 32. Diaphragm 31 is of a size to cover the inside semi-circular surface of mold part 22.

Mold part 22 is held against mold part 21 by piston rod 23 which carries a piston 33 inside of cylinder 11. The pressure maintained on mold part 22 is of greater amount than the extrusion pressure on the cheese extruded into mold 10 in order to insure that the mold parts will not be separated.

Piston 33 is operated by air supplied through line 34 from a source, not shown. Line 34 is connected to a pressure regulator 35 which in turn is connected to cylinder 11 by a line 36 to which is connected the valve 37 and the pressure gauge 38. The regulator 35 may be set to indicate a pressure on gauge 38 of a predetermined number of pounds, for example seventy pounds, and valve 37 when opened permits the air to pass to cylinder 11 from regulator 35 and maintain piston 33 under a constant pressure greater than the extrusion pressure on the cheese curd extruded from cylinder 1.

Diaphragm 31 is free to move inside of mold 10 and is backed by air. The air is supplied between mold part 22 and diaphragm 31 through line 39 which is connected through valve 40 and pressure regulator 41 to line 36. The regulator 41 may be set for a pressure up to five pounds so that air passing through line 39 for delivery to the back of the diaphragm when valve 40 is opened, will force the diaphragm forwardly into mold part 21 as shown in Fig. 2 at the start of the operation of expressing cheese into mold 10.

In the operation of the mold when the cheese curd to be processed into cheese is deposited in cylinder 1, mold part 22 is closed against mold part 21 by opening valve 37 to let air into cylinder 11 and provide a constant pressure on piston 33. Valve 40 is then opened and air passing through line 39 expands diaphragm 31 from mold part 22 into mold part 21.

Cheese curd is then expressed from cylinder 1 by actuation of piston 5. After passing through the various parts of the apparatus described, the processed cheese curd is forced into mold 10. As the cheese moves into the mold it is packed solidly therein without voids by the force exerted on the cheese by diaphragm 31 which gradually recedes into mold part 22 under the greater force exerted on the cheese by the actuation of piston 5 in cylinder 1.

In order to ascertain the pounds of cheese expressed into mold 10, a load gauge 42 projects through the wall of mold part 22 and carries an enlarged end 43 of soft material which engages the back of diaphragm 31. The gauge 42 may be marked with pound markings such as two, three, four and five pounds to indicate to the operator the pounds of cheese in the mold 10. Gauge 42 is spring loaded by coil spring 44 so that the gauge is normally inwardly of mold part 22 and enlarged end 43 fits within complementary depression 45 in mold part 22 when the diaphragm is completely expanded. If every production run is to produce a round or spherical slug of cheese then the gauge will show the highest marking and the extrusion into the mold will not stop at two or three pounds as indicated on the gauge.

After mold 10 is filled with the cheese desired, knife plate 24 is lowered to sever the cheese between mold 10 and stretching section 9. Valve 40 is then opened to release the pressure behind diaphragm 31 and valve 37 is also opened to release the air pressure on piston 33. After these valves are opened handle 30 is grasped by the operator and mold part 22 is separated from mold part 21, the mold part 22 moving along rod 28 and piston 33 receding into cylinder 11. The round ball of cheese may then be removed from mold 10.

The air cylinder and piston arrangement for holding mold parts 21 and 22 together is employed in the apparatus where it may be desirable to replace the round forming mold with a mold such as is shown in the copending application referred to. In that application the piston is placed under a constant pressure slightly less than the extrusion pressure so that the piston will recede as the mold is filled. When the round mold of the present invention is employed it is also contemplated that the mold parts 21 and 22 may be held together by other means such as by clamps or bolts.

Molds of different sizes may obviously be employed.

It is also important that the cavity in the mold part 22 be slightly larger than the cavity in part 21 to compensate for the thickness of the diaphragm 31 as it recedes into the mold part 22 and thereby forms a ball of cheese of uniform diameter.

The invention provides apparatus for forming cheese to a round ball like-contour without manual contact.

Various modes of carrying out the invention are contemplated as being within the scope of the following claim particularly pointing out and distinctly claiming the subject matter which is regarded as the invention.

I claim:

A mold for receiving cheese under a predetermined pressure from a source of cheese supply and forming the cheese into a generally round ball-like shape, which comprises first and second mold members with each member having a complementary semi-spherical contour on the inside holding means connected to the first of said members and holding the free end of the first member into sealing engagement with the free end of the second member to provide a circumferential sealed joint between the members, a flexible impervious diaphragm secured at the joint between said members and separating the mold members into two chambers, the second mold member having an opening generally centrally of the wall of said second member for the passage of cheese from the source of cheese supply under a predetermined pressure into one of the chambers of the mold on one side of the diaphrgam, a pressure line secured to the first member and connected to the second chamber of the mold, means to supply fluid through said pressure line and into the second chamber of the mold on the other side of the diaphragm at a lesser amount than the pressure on said cheese to gradually recede the diaphragm under said higher pressure on the cheese as the cheese enters the first chamber of the mold and thereby form the cheese to the inner contour of the mold members, and cutting means secured to the second member and slidable across the opening in the wall of said second member to separate the cheese in the mold from the source of cheese supply, and means to release the holding means to separate the mold members from each other to remove the molded cheese.

References Cited in the file of this patent
UNITED STATES PATENTS

| | | |
|---|---|---|
| 1,632,559 | Pedrick | June 14, 1927 |
| 2,206,419 | Miller | July 2, 1940 |
| 2,509,570 | Lee | May 30, 1950 |
| 2,571,476 | Offutt | Oct. 16, 1951 |
| 2,641,797 | Waltman | June 16, 1953 |